United States Patent [19]

Geese et al.

[11] E Re. 29,968

[45] Reissued Apr. 17, 1979

[54] MEANS FOR MOUNTING A WORK ROLL ON A SHAFT

[75] Inventors: Karlheinz Geese, Duisburg-Rahm; Hermann Oberscheven, Duisburg-Wedau; Karl Pradel, Duisburg-Wanheinerort, all of Fed. Rep. of Germany

[73] Assignee: Morgan Construction Co., Worcester, Mass.

[21] Appl. No.: 790,596

[22] Filed: Apr. 25, 1977

Related U.S. Patent Documents

Reissue of:

[64] Patent No.: 3,803,691
Issued: Apr. 16, 1974
Appl. No.: 362,161
Filed: May 21, 1973

U.S. Applications:

[63] Continuation of Ser. No. 232,221, Mar. 6, 1972, abandoned, which is a continuation of Ser. No. 12,682, Feb. 19, 1970, abandoned.

[30] Foreign Application Priority Data

Jun., 1920 [AT] Austria ..... 80819
Oct., 1936 [DE] Fed. Rep. of Germany ..... 636325

[51] Int. Cl.[2] ..... F16B 1/00
[52] U.S. Cl. ..... 403/15; 29/252; 403/31; 403/368

[58] Field of Search ..... 403/365-368, 403/370-372, 374, 15, 16, 31; 29/252

[56] References Cited

U.S. PATENT DOCUMENTS

| | | | |
|---|---|---|---|
| 26,387 | 12/1859 | Van Deventer | 287/52.06 |
| 2,556,151 | 6/1951 | Bremer | 287/52.06 |
| 2,610,515 | 9/1952 | Williams | 74/230.17R |
| 2,718,155 | 9/1955 | Firth | 74/230.17R |
| 2,764,437 | 9/1956 | Bratt | 403/15 |
| 2,835,518 | 5/1958 | Nash | 287/52.06 |
| 2,889,161 | 6/1959 | Powell et al | 287/52.06 |
| 2,956,826 | 10/1960 | Nord | 287/52R |
| 3,014,271 | 12/1961 | Englund | 29/263 |
| 3,020,628 | 2/1962 | Sage | 29/200D |
| 3,033,597 | 5/1962 | Miller | 403/15 |
| 3,190,681 | 6/1965 | Liebe | 403/15 |
| 3,514,136 | 5/1970 | Kennicott | 403/370 |
| 3,514,137 | 5/1970 | Brown et al. | 403/370 |
| 3,543,373 | 12/1970 | Hulak | 29/200D |
| 3,727,957 | 4/1973 | Brown et al. | 403/370 |
| 3,841,771 | 10/1974 | Shankwitz et al. | 403/371 X |

FOREIGN PATENT DOCUMENTS

| | | |
|---|---|---|
| 80,819 | 6/1920 | Austria. |
| 636,325 | 10/1936 | Fed. Rep. of Germany. |

OTHER PUBLICATIONS

SKF Hydraukikmuttern.

*Primary Examiner*—Wayne L. Shedd
*Attorney, Agent, or Firm*—Thompson, Birch, Gaunthier & Samuel

[57] ABSTRACT

Means for mounting a work roll on a shaft. A cylindrical collet having at least one tapered surface, either exterior or interior, is pushed into an annular space between the roll shaft and work roll, one or both of these latter components having a reversely tapered surface which cooperates with the tapered surface or surfaces on the collet to provide a self-locking frictional connection. The collet is inserted and withdrawn from the annular space by mechanical or pneumatically operated mechanisms which coact with the collet and the shaft end or work roll.

8 Claims, 7 Drawing Figures

MEANS FOR MOUNTING A WORK ROLL ON A SHAFT

Matter enclosed in heavy brackets [ ] appears in the original patent but forms no part of this reissue specification; matter printed in italics indicates the additions made by reissue.

This is a continuation of U.S. Pat. application Ser. No. 232,221 filed on Mar. 6, 1972, which in turn is a continuation of U.S. Pat. application Ser. No. 12,682 filed on Feb. 19, 1970, both applications being abandoned.

DESCRIPTION OF THE INVENTION

This invention relates generally to work rolls of the type which are mounted on the ends of drive shafts, and more particularly to an improved means for axially mounting and locking such rolls on the drive shaft. The invention is especially useful in mounting work rolls on the high speed finishing stands of a rod rolling mill where cemented metal carbide rolls or heat treated steel rolls with carbide surface layers are employed. However, it will be appreciated from the following detailed description that other uses are also contemplated.

In conventional rod mills, the work rolls are clamped onto the tapered ends of drive shafts by means of split collets, the latter having tapered bores. In order to accommodate roll changing, the tapered mating surfaces of the collets and roll shafts are not designed to provide a self-locking relationship, and torque is transmitted from the roll shafts to the work rolls by means of conventional cross keys. Location of the work rolls is effected by expanding the split collets when axially sliding them onto the tapered roll shaft seats. This is usually accomplished by means of nuts threaded onto center screws extending axially from the shaft end faces.

Experience has indicated, however, that this type of work roll mounting is entirely inadequate because during the rolling operation, the fit between the work rolls and their respective shafts loosens, thus causing damage to the tapered shaft surfaces, as well as to the other mating components. The split collets force themselves into the shaft surfaces, thus precluding permanent positive concentricity. Furthermore, due to the loose fit that eventually develops between the work rolls and their respective shafts, foreign material such as for example dirt, grit, mill scale, etc. eventually penetrates between the rolls and shafts, thus further impairing concentricity. As this condition worsens, it becomes increasingly difficult to maintain tolerances during rolling, and work roll breakage frequently results. Another contributing factor to roll breakage is the stresses produced by torque transmission through mechanical engagement of the cross keys and the notches within which the keys are seated. These stresses eventually produce cracks in the various components, particularly the rolls, due to the inherent brittleness of the roll material employed.

In other industrial applications, non slit self-locking collets are frequently employed to clamp discs, work rolls or other cylindrical members onto shafts. The non-slit collets are, however, less common than slit-collets, primarily because it is far more difficult to assemble and disassemble components where non-slit collets are employed.

In rolling mill applications, there exists still another arrangement where work rolls are centered on a drive shaft and clamped at either end by tapered collets. Such designs operate well for the life of the work rolls, but roll changing is extremely difficult, often necessitating damage to and/or destruction of various components in the roll assembly. Thus where frequent roll changing is required, as is the case with work rolls in the finishing stands of high speed rod rolling mills, such arrangements are totally impractical.

It is accordingly, a general object of the present invention to provide an improved means for mounting work rolls on drive shafts, which means obviates the difficulties and disadvantages mentioned above.

Another and more specific object of the present invention is to provide an arrangement for mounting, centering and aligning work rolls on the ends of drive shafts, which arrangement employs non-split tapered collets, with improved means for rapidly and efficiently inserting and removing the collets without damaging other components of the roll assembly.

A further object of the present invention is to provide an improved means for transferring torque from roll shafts to work rolls by frictional engagement without relying on cross-keys or other like mechanical type connections.

These and other objects and advantages of the present invention will become more apparent as the description proceeds with the aid of the accompanying drawings in which.

Figure 1:
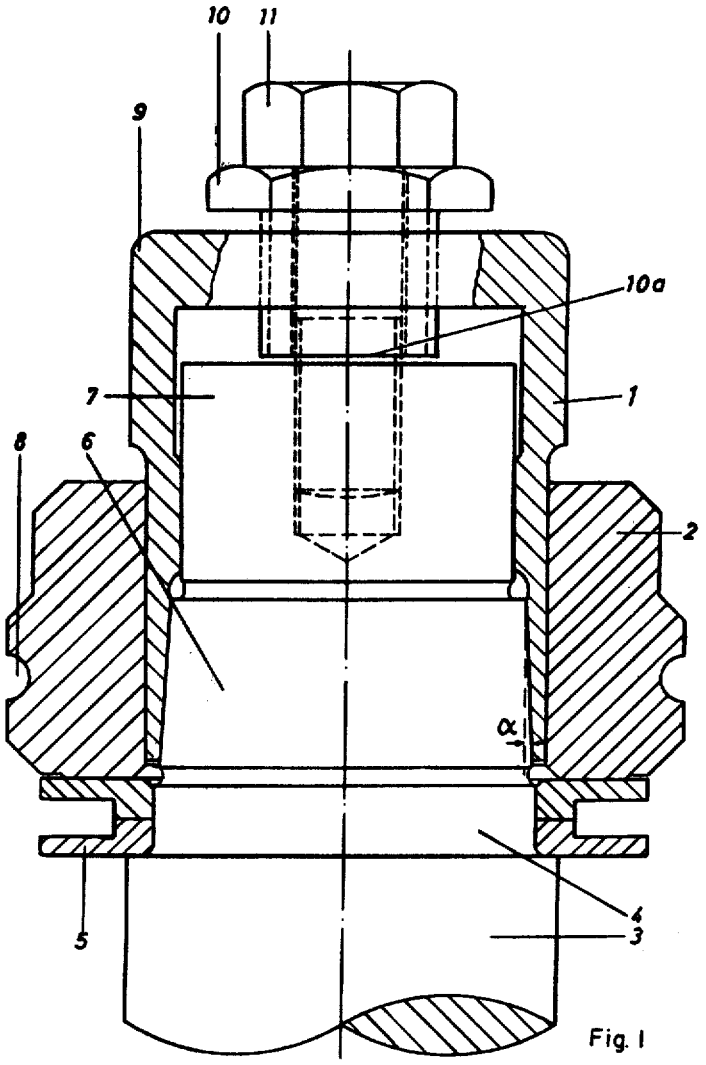
FIG. 1 is a sectional view of a roll assembly employing one embodiment of the present invention.

With reference initially to FIG. 1, there is shown a work roll 2 rigidly mounted on the end of a shaft 3 by means of a non-slit collet 1. Adjacent to its cylindrical portion, the shaft 3 is provided with a groove 4 in which is mounted a ring 5 serving to seal the housing (not shown) against contamination by cooling water, mill scale, etc. Proceeding axially along the shaft 3, the groove 4 is followed by a tapered portion 6 disposed at an angle of $\alpha$ which is within the self-locking range. In practice, it has been determined that angle $\alpha$ should be about 2.5° for an arrangement of the type disclosed in the drawings. The tapered portion 6 is followed by a short cylindrical portion 7 which terminates at the shaft end. The interior of collet 1 is also provided with a reversely tapered surface and a cylindrical surface suitably spaced and arranged to cooperate with the surfaces 6 and 7 on shaft 1. The portion of collet 1 which projects into the work roll 2 has a cylindrical outer surface, and the work roll 2 has a cylindrical bore extending axially therethrough. The work roll 2 is fabricated of appropriate known materials, for example cemented metal carbide, and is provided with an exterior surface groove 8 which cooperates with an identical groove in a mating roll (not shown) to roll stock therebetween.

Collet 1 is further provided with an end cover or cap 9 having an axial bore into which is threaded a bushing 10. A screw 11 is threaded through bushing 10 and into a threaded bore in the end of shaft 3.

The work roll 2 is mounted on the end of shaft 3 in the following manner; work roll 2 and collet 1 are initially axially inserted over the shaft end 3 with the work roll being pushed into contact with ring 5. Bushing 10 is then backed off until a gap is provided between its end face 10a and the end of shaft 3. Screw 11 is then tightened while preventing rotation of bushing 10. As soon as the shoulder of the hexagonal head or screw 11 contacts bushing 10, further tightening of screw 11 effects axial insertion and tightening of the collet 1 on a tapered shaft surface 6. When this occurs, the relatively thin tapered wall section of the collet (wall thickness of the tapered section amounting on an average of approximately 1/20 of the collet diameter) is radially expanded outwardly against the work roll. It will of course be understood that the collet 1 is fitted in the roll ring with relatively close tolerances. Thus as screw 11 is tightened, the collet is axially inserted and its tapered wall section is simultaneously radially expanded against the bore of the work roll. This in turn causes the work roll to be centered and locked on shaft 3. The maximum torque exerted on screw 11 will depend on a number of variable such as the torque to be transmitted to the work rolls by shaft 3, the inherent material strength of collet 1 and shaft 3 as well as the fatigue strength of the work roll 2. Screw 11 remains tightened during roll use.

When removing the work roll, the procedure is as follows: screw 11 is initially loosened, with the work roll 2 remaining clamped due to the self-locking effect of the tapered section of collet 1 which is wedged between the work roll and the tapered roll surface 6. With screw 11 loosened, bushing 10 is next screwed deeper into the threaded bore on the end of the collet cap 9. When the face 10a of the bushing contacts the end of the shaft 3, further tightening of the bushing causes the collet 1 to be withdrawn axially from the end of shaft 3. This removes the self locking clamping action and frees the work roll 2 for removal.

The embodiment shown in FIGS. 2–5 corresponds in essential parts to that shown in FIG. 1 with the exception that the outboard end of the collet 1' is designed in a somewhat different manner. More particularly, it will be seen that collet 1' is provided with an exterior collar 12 forming a shoulder 13 followed by a groove 14. The top of collar 12 terminates in a plurality of circumferentially spaced radially disposed fingers 15. During operation, the ends of the collet and shaft are protected by a hood 16 (See FIG. 2) which is secured to the shaft by means of screws 17. The hood 16 rests against the end of collet 1' when thus secured to shaft 3.

A cross key 18 extends laterally through shaft 3 and collet 1' with its ends (best shown in FIG. 3) protruding into recesses of the work rolls. Cross key 18 serves merely as a means of assisting in the initial assembly of the components by preventing the work roll 2 and collet 1' from falling out during the clamping procedure. The ends 19 of the cross key do not contact the sides of the work roll recesses into which they protrude and thus, the cross key cannot transmit torque during operation. The cross key is held in place by a central screw 20.

Figure 2:
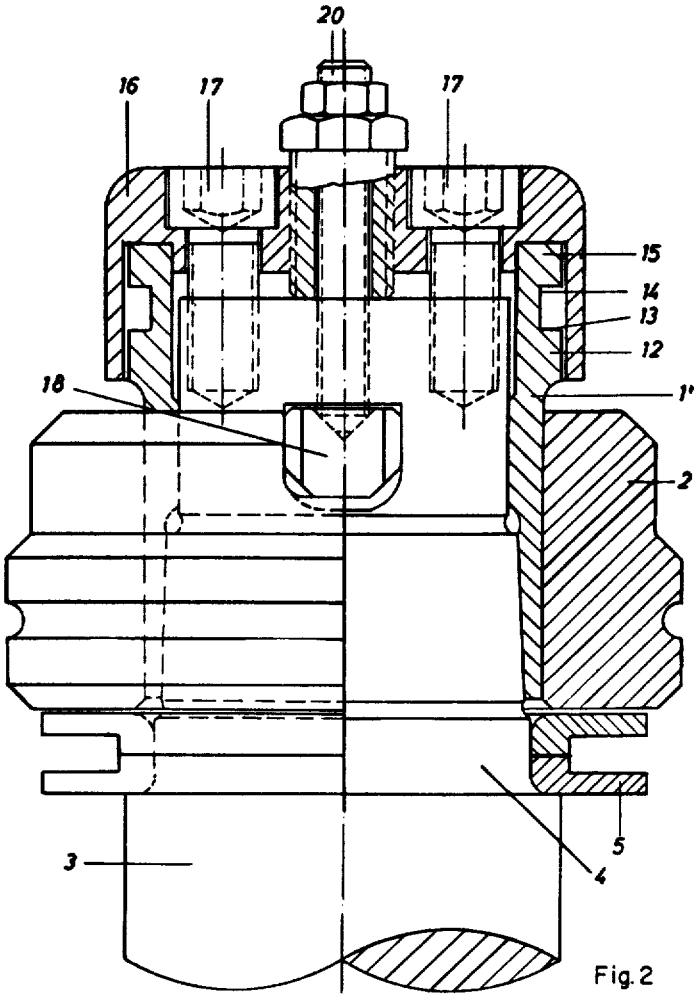
FIG. 2 is a cross-sectional view of another roll assembly employing an alternate embodiment of the invention.
Figure 3:
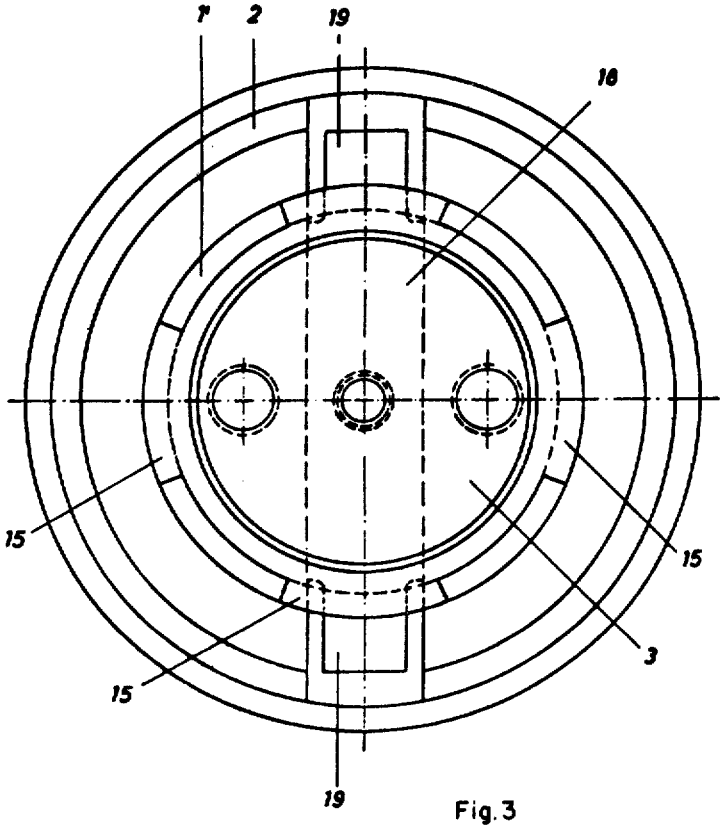
FIG. 3 is an end view of the arrangement shown in FIG. 2 with the protective end cover removed.
Figure 4:
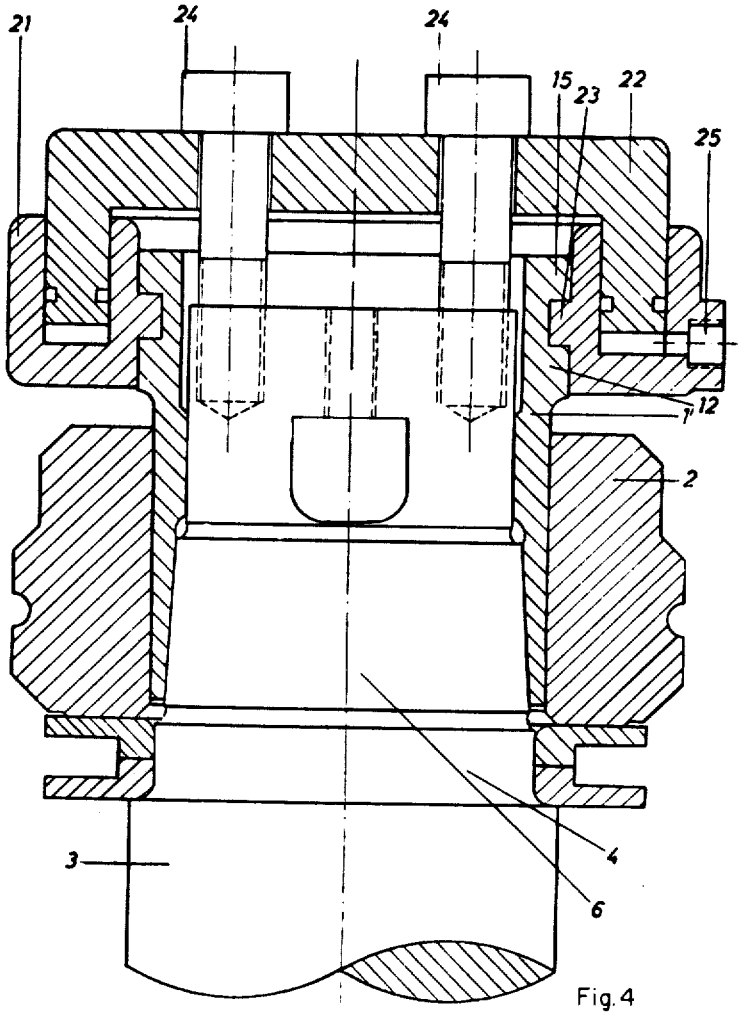
FIG. 4 is a sectional view of the embodiment shown in FIG. 2 with a hydraulically operated collet inserting device shown in its operative position.

Assembly of the embodiment shown in FIGS. 2 and 3 will now be described with further reference to FIG. 4. The collet 1' is pressed into place by a hydraulic device consisting of a cylinder portion 21 and a piston portion 22. The cylinder portion 21 is annular in shape with a series of circumferentially spaced inwardly extending radial fingers 23 interlocking with the fingers 15 on collet 1' to form a bayonet-type connection. The piston portion 22 is shaped somewhat like a cap and is secured to the shaft 3 by means of bolts 24. Hydraulic fluid is forced into the cylinder portion 21 through a connection 25. This causes the cylinder portion 21 to move downwardly in relation to the piston portion 22 which is in turn secured to the shaft 3. The fingers 23 on the cylinder portion bear against the shoulder 13 on the collar 12 of collet 1', thereby forcing the collet downwardly between the work roll 2 and the tapered portion 6 of shaft 3. In this manner, the work roll is centered and tightly locked on the shaft.

Figure 5:
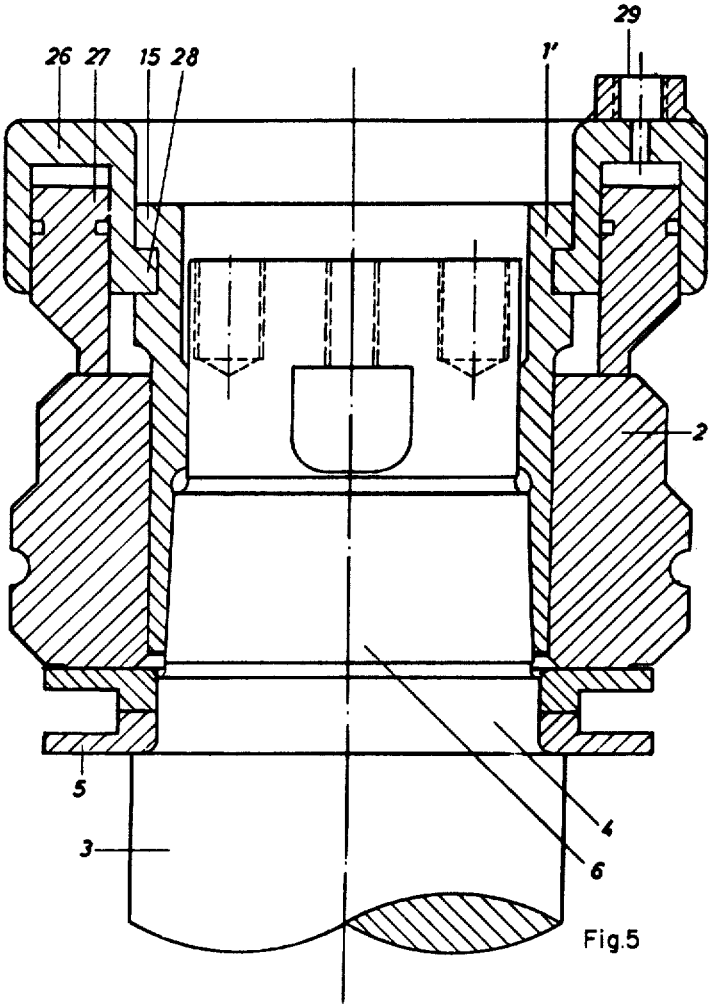
FIG. 5 is a view similar to FIG. 4 but with a hydraulically operated collet retracting device operatively positioned.

As is further depicted in FIG. 5, a hydraulic retracting device is employed to remove collet 1'. The retracting device is comprised of an annular cylinder portion 26 and an annular piston 27. The cylinder portion 26 is equipped with circumferentially spaced radial fingers 28 which are initially positioned by means of axial insertion and rotation to underlie the fingers 15 on the end of collet 1'. The piston portion 27 is slidable relative to the cylinder portion 26 and rests against work roll 2. When hydraulic fluid is introduced through connection 29, the cylinder portion 26 is pushed up relative to piston portion 27, thereby retracting the collet 1' with the result that the work roll 2 is freed for removal from the shaft 3.

Figure 6:
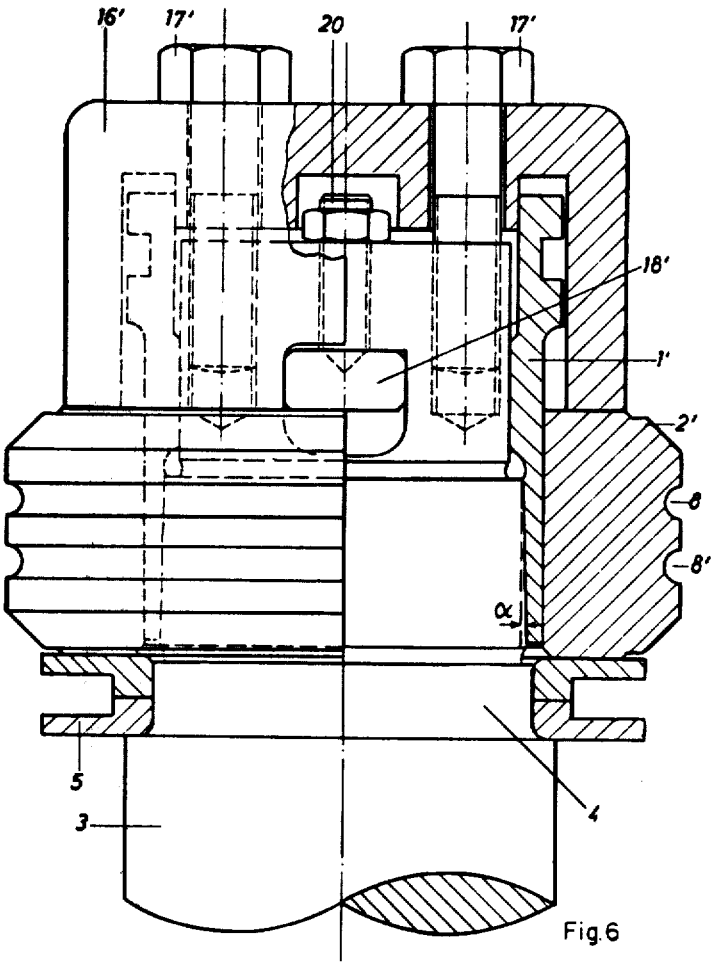
FIG. 6 is a sectional view of a roll assembly employing still another embodiment of the invention.

The embodiment shown in FIG. 6 differs from the embodiments previously described in that the work roll 2' is provided with two axial spaced grooves 8 and 8'. Stock is first rolled in groove 8. When this groove is worn, the work roll 2' is reversed and groove 8' is utilized.

The cap 16' shown in FIG. 6 is provided with a wider skirt which abuts against work roll 2'. When the bolts 17' are tightened, the cap 16' is thus brought into frictional engagement with work roll 2'. If desired, this frictional engagement may be increased by etching or otherwise roughening the contacting surfaces. This arrangement contributes considerably to the ability of the assembly to transmit torque from shaft 3 to work roll 2'. This additional friction allows the surface pressure between collet 1' and work roll 2' to be kept relatively low. Thus, the required circumferential stress of the work roll 2' is decreased and the risk of roll breakage reduced. Furthermore, the axial pressure exerted by the hood 16 on the work roll 2' opposes some of the lateral forces exerted by the stock during rolling and thus avoids the possibility of these forces causing the work rolls to split.

With the embodiment shown in FIG. 6, and contrary to that shown in FIGS. 2–5, the work 2' does not have recesses for the cross key 18'. The cross key merely rests against the outboard side of the work roll 2', with both ends of the key entering into corresponding recesses in the skirt of cap 16'. It will therefore be seen that in addition to serving as a mounting assist, the key 18 also serves, along with bolts 17' as a means of transferring torque from the drive shaft 3 to the cap 16', the latter being in frictional contact with the work roll 2'.

Figure 7:
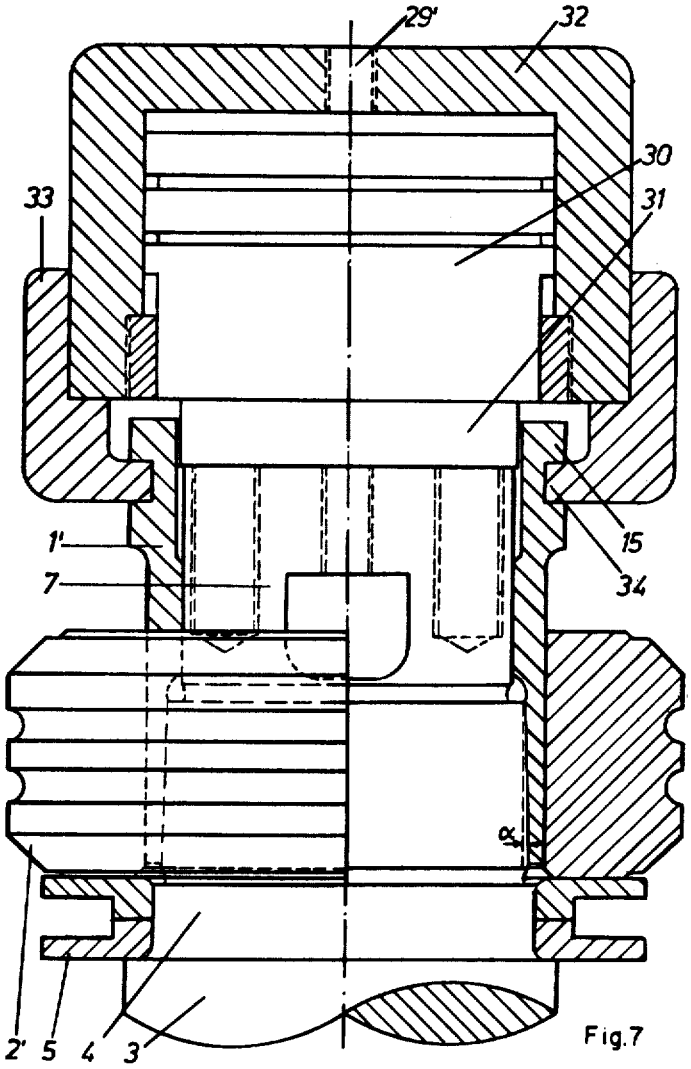
FIG. 7 is a view similar to FIG. 6 with a different collet retracting device shown operatively positioned.

Another embodiment of a hydaulic device serving as a collet retracting tool is depicted in FIG. 7. The piston portion 30 comprises a solid member with a nose 31 having a diameter which enables it to be easily introduced into the collet 1' to abut the end of shaft 3. The cap shaped cylinder portion 32 is provided with a collar 33 having inwardly disposed fingers 34 which cooperate with the fingers 15 on collet 1' to provide a bayonet connection. Introduction of hydraulic fluid through connection 29' thus causes retraction of collet 1'.

Although the embodiments described above are considered as particularly advantageous examples of the application of the present invention, it should be understood that modifications and departures from the illustrated examples are possible within the scope of the invention. For example, it is possible to fasten a work roll on a cylindrical shaft end. In this case, the collet is cylindrical on the inside and tapered on the outside. Accordingly, the work roll 4 is also tapered. Moreover, by modifying the design on the shaft work roll, a collet having tapered inner and outer surfaces may also be employed. Also, the invention may be employed not only to secure a work roll to the end of the shaft but also to secure work rolls at any desired location along the length of the shaft.

By employing the present invention, it is possible to obtain absolutely tight connections between shafts and work rolls, which connections do not loosen under continuous high speed heavy duty service. Centering of the work roll on the shaft is such that tolerances on the product being rolled can be kept within ranges which previously were not obtainable. Furthermore, damage to the shafts, slide rings and collets due to operating conditions and frequent roll changes are eliminated. Transmission of torque to the work rolls from the drive shafts is accomplished by frictional force, thus obviating the problems previously caused by notch stresses resulting from the use of cross keys. Work roll breakage thus is avoided and the useful life of the work rolls is extended substantially. Finally, by employing the present invention, work rolls may be changed in the shortest possible time by employing a few simple tools.

It is our intention to cover all changes and modifications of the embodiments herein chosen for purposes of disclosure which do not constitute departures from the spirit and scope of the invention.

We claim:

[1. For use in combination with a shaft, a roll axially mounted on the shaft, and a collet member having one end adapted to be wedged in an operative position between the shaft and the roll, apparatus comprising fluid actuated tool means for axially moving the collet member into and out of its operative position, said tool means being removably mounted at the end of the shaft and being engageable with the collet member and the shaft.]

[2. The apparatus as claimed in claim 1 wherein said tool means includes first and second alternatively usable tool assemblies, said first tool assembly being adapted to move the collet member in one direction relative to the shaft in order to force the collet member into its operative position, and said second tool assembly being adapted to move the collet member in the opposite direction relative to the shaft in order to remove the collet member from its operative position.]

[3. The apparatus as claimed in claim 2 wherein said first and second tool assemblies each comprise a piston and a cylinder.]

4. For use with a combination of components which includes a work roll *having a cylindrical inner surface* mounted on a roll shaft *having a tapered outer surface,* an apparatus *for mounting the work roll on the roll shaft* comprising: *stop means on the roll shaft for limiting the extent to which the work roll may be inserted axially on the roll shaft, retaining means engageable with the roll shaft and the work roll* for *holding the work roll against said stop means,* a collet member having *a cylindrical exterior surface and a tapered interior surface terminating at* one end *which is* adapted to be wedged in an operative position between the work roll and the roll shaft, *a collar at the other end of said collect member,* and fluid actuated tool means for axially moving said collet member relative to the roll shaft in opposite directions into and out of said operative position, said tool means being removably mounted at one end of the roll shaft and *having an annular section adapted to surround said collar, with connecting means on said collar and said annular section for removably attaching said tool means to said collet member, said tool means* being operative to exert an axially directed force on said collet member in one direction while simultaneously exerting an opposite axially directed force on one of the other aforesaid components.

[5. The apparatus as claimed in claim 4 further characterized by a collar at the said other end of said collet member, an annular section on said tool means adapted to surround said collar, and connecting means on said collar and said annular section for removably attaching said tool means to said collet member.]

6. The apparatus as claimed in claim [5] *4* wherein said connecting means includes a groove on said collar, circumferentially spaced first finger members extending radially outwardly from said collar on one side of said groove, an annular shoulder on the other side of said groove, and circumferentially spaced second finger members extending inwardly from said annular section, said second finger members being adapted for positioning in said groove between said shoulder and said first finger members when said tool means is removably attached to said collet member.

7. The apparatus as claimed in claim [5] *4* wherein said fluid actuated tool means is comprised of a cylinder member forming a chamber and a piston member mounted for reciprocal movement in said chamber, said cylinder member having an annular section which is adapted to surround the other end of said collet member, and connecting means on said annular section and the other end of said collet member for removably attaching said tool means to said collet member.

8. The apparatus as claimed in claim 7 wherein said chamber is annular in shape and formed within said annular section.

9. The apparatus as claimed in claim 8 wherein said piston member is circular in shape, and means for fixing said piston member in relation to the roll shaft, whereupon when hydraulic fluid is injected into said chamber, said cylinder member is moved axially in one direction relative to said piston member and the roll shaft, thus axially forcing said collet member in the same direction into said operative position.

10. The apparatus as claimed in claim 7 wherein the combination of said chamber and the piston member reciprocally contained therein is disposed oppositely to the end of the roll shaft when said annular section is connected to the other end of said collet member, whereupon when hydraulic fluid is injected into said chamber, said piston member bears against the end of the roll shaft and said cylinder member is moved axially in one direction relative to both said piston member and the roll shaft, thus axially withdrawing said collet member in the same direction from said operative position.

11. The apparatus as claimed in claim [5] *4* wherein said piston member is circular in shape and positioned to contact the work roll when said annular section is connected to the other end of said collet member, whereupon when hydraulic fluid is injected into said chamber, said piston member bears against the work roll and said cylinder member and collet member move axially away from the work roll, thereby axially withdrawing said collet member from said operative position.

12. For use in combination with a work roll carried on a roll shaft, apparatus comprising: *stop means on the roll shaft for limiting the extent to which the work roll may be inserted axially onto the roll shaft, retaining means engageable with the roll shaft and the work roll for holding the work roll against said stop means,* a [non-slit] collet member having [one] *a non-slit* end adapted to be axially inserted in an operative position between the work roll and the roll shaft, said collet member having [at least one] *a cylindrical exterior surface and a* tapered *interior* surface at the said [one] *non-slit* end which cooperates [with a reversely tapered surface] *respectively with a cylindrical interior surface on the work roll and a tapered exterior surface* on [either] the roll shaft [or work roll] to provide a wedged self-locking relationship [between], *with torque being transmitted to* the work roll [and] *from the* roll shaft *solely as a result of said wedged self-locking relationship* when the collet member is in said operative position, and [removably mounted] fluid-actuated tool means for moving said collet member into and out of said operative position, said tool means being *removably* engageable with the other end of said collet member and the roll shaft.

[13. For use in combination with a work roll carried on a roll shaft, apparatus comprising: a collet member having one end adapted to be wedged in an operative position between the work roll and the roll shaft, the other end of said collet member having an integral face which is disposed oppositely to and spaced axially from the end of the roll shaft when the collet member is operatively positioned, a threaded aperture in said face, said aperture being coaxial with the rotational axis of both said shaft and said work roll, and tool means for axially moving said collet member relative to the shaft in opposite directions into and out of said operative position, said tool means being threaded through said aperture into cooperative engagement with the end of said shaft.]

[14. The apparatus as claimed in claim 13 wherein said tool means is comprised of a bushing member threaded through said aperture, and a bolt member threaded through said bushing member and into threaded engagement with the end of said shaft.]

* * * * *